United States Patent
Imeh et al.

(10) Patent No.: US 11,584,652 B2
(45) Date of Patent: Feb. 21, 2023

(54) PROCESS FOR FORMING A PURE CARBON POWDER

(71) Applicants: Mike E. D. A. Imeh, Katy, TX (US); Victoria Okotie, Katy, TX (US); Esther Imeh-Ogaga, Katy, TX (US)

(72) Inventors: Mike E. D. A. Imeh, Katy, TX (US); Victoria Okotie, Katy, TX (US); Esther Imeh-Ogaga, Katy, TX (US)

( * ) Notice: Subject to any disclaimer, the term of this patent is extended or adjusted under 35 U.S.C. 154(b) by 179 days.

(21) Appl. No.: 17/209,641

(22) Filed: Mar. 23, 2021

(65) Prior Publication Data

US 2021/0300764 A1    Sep. 30, 2021

Related U.S. Application Data

(60) Provisional application No. 62/993,790, filed on Mar. 24, 2020.

(51) Int. Cl.
| | | |
|---|---|---|
| *C01B 32/318* | (2017.01) | |
| *C01B 32/342* | (2017.01) | |
| *B01J 20/30* | (2006.01) | |
| *B01J 20/20* | (2006.01) | |
| *C01B 32/378* | (2017.01) | |

(52) U.S. Cl.
CPC ........... *C01B 32/342* (2017.08); *B01J 20/20* (2013.01); *B01J 20/3021* (2013.01); *B01J 20/3071* (2013.01); *C01B 32/318* (2017.08); *C01B 32/378* (2017.08)

(58) Field of Classification Search
CPC .................................................. C01B 32/318
See application file for complete search history.

(56) References Cited

U.S. PATENT DOCUMENTS

2013/0023409 A1* 1/2013 De Leij ............ B01J 20/28088
                                                                502/437

* cited by examiner

*Primary Examiner* — Stuart L Hendrickson
(74) *Attorney, Agent, or Firm* — Egbert, McDaniel & Swartz, PLLC

(57) ABSTRACT

A process for forming a pure carbon product has the steps of soaking charcoal with hydrochloric acid to remove solids from the charcoal, removing the hydrochloric acid from the soaked charcoal, drying the charcoal, grinding the dried charcoal into a fine powder, mixing water with the fine powder, washing the fine powder, removing the water so as to from a charcoal slurry, and drying the charcoal slurry so as to form the pure carbon powder. The charcoal slurry has a skim on the surface thereof. The skim is removed.

19 Claims, 1 Drawing Sheet

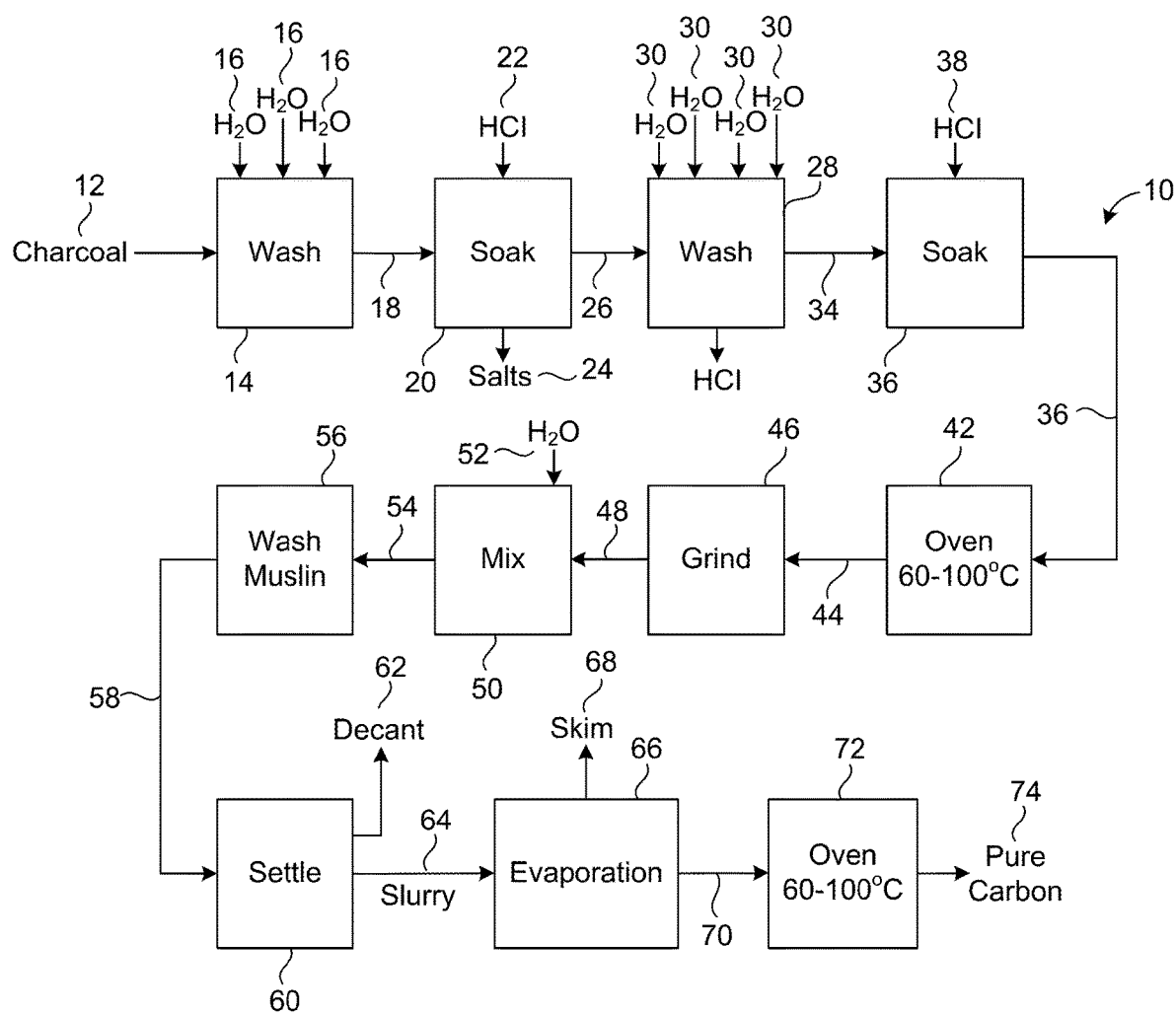

PROCESS FOR FORMING A PURE CARBON POWDER

RELATED U.S. APPLICATIONS

The present application claims priority from U.S. Patent Application Ser. No. 62/993,790, filed on Mar. 24, 2020, and entitled "Process for Forming a Pure Carbon Powder".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to process for making activated carbon particles. More particularly, the present invention relates to processes whereby charcoal is converted to a superfine carbon powder. More particularly, the present invention the relates to a process for forming a pure carbon product in which the carbon product is directed toward the reduction of greenhouse emissions.

2. Description of Related Art Including Information Disclosed Under 37 CFR 1.97 and 37 CFR 1.98

The adsorptive properties of activated carbon make it exceptionally useful in the purification and separation of fluids, i.e. gases, liquids and vapors. Activated carbon is a twisted network of carbon layer planes, cross-linked by aliphatic bridging groups. It remains amorphous because of randomly cross-linked networks that inhibit reordering of the structure even when heated to 3000° C. The vast surface area of the internal pore structure that is produced during the preparation of activated carbon comprises the most significant physical characteristic of this material. The effective surface area of a product in a specific application sometimes is more accurately indicated by adsorption isotherms for the appropriate adsorptives. Studies also indicate that the macro porosity of the carbon affects transfer of adsorbate molecules to adsorption sites within the particle and that the adsorption capacity and rate of adsorption depend not only upon the lateral surface area, pore size distribution, and pore shape but also the surface chemistry of the activated carbon.

The interaction of free radicals on the carbon surface with atoms, such as nitrogen and oxygen, both from the carbon precursor and from the atmosphere result in the formation of functional groups when the carbon is being activated. These functional groups cause the surface of the activated carbon to become chemically reactive which influences the adsorptive properties of the activated carbon. As a result, the surface characteristics of the activated carbon can be amphoteric, that is either acidic or basic to the formation of carboxylic groups, hydroxyl or carbonyl groups. These groups can interact with water causing increased hydrophilicity of the carbon surface. The formation of these groups influence the electrokinetic properties, and affect not only use as a catalyst support, and the adsorption of various molecular species, but also the reaction with certain solvents in solvent recovery applications.

Gas-phase applications for activated carbons include gas separation, gas storage and catalyst which exploit the differences in the adsorptive behavior of gases and vapors on the basis of molecular weight and molecular size. Some gas-phase applications include solvent recovery, gasoline emission control, adsorption of radionucleotides, protection against atmospheric contaminants, gas storage, catalysts, and process stream separations. Gas entrapment by activated carbons results from adsorption forces acting on gas molecules held in micro pores that significantly condense on the adsorptive material.

The process permits separation of oxygen from air and recovery of methane from inorganic gases and biogas production. The process also allows for the separation of hydrogen from gases produced in the catalytic cracking of gasoline or the separation of carbon monoxide from fuel gases. These processes, in addition to pressure swing adsorption, include thermal swing adsorption and vacuum swing adsorption.

The rapid development of industrial technologies has significantly increased the concentration of greenhouse gases such as $CO_2$, $CH_4$, HFCs, and PFCs in the atmosphere. The greenhouse effect of these gases leads to environmental pollution, exacerbates global warming, raises ocean water levels, and affects the balance of the ecosystem. Among the greenhouse gases, the greenhouse effect of carbon dioxide has the greatest impact on global warming. Aggressive efforts are being made to develop technologies to capture carbon dioxide to mitigate the greenhouse effect. In addition, the captured carbon dioxide, which is non-toxic and inexpensive, can be used to produce various organic solvents, chemicals, and media materials (such as calcium carbonate, glucose, and starch), and thus it can potentially bring substantial commercial benefits.

The fabrication of high-quality activated carbon produces results as the activation temperature and activation time increase in the activated carbon. In addition, iodine adsorption, ash content, pH value, and total pore volume increase with activation temperature. It is found that activated carbon has significantly improved effects in the removal of greenhouse gases from industrial processes.

In the past, various patents have issued with respect to the production of activated carbon. For example, U.S. Pat. No. 3,910,849, issued on Oct. 7, 1975 to Kawabata et al., discloses a method for the manufacture of activated carbon. At least two horizontal perforated plates are vertically spaced. A powdered or granular carbonaceous substance is fed into the lowermost of the perforated plates and, at the same time, a hot activating gas is introduced upwardly from below the lowermost horizontal perforated plate so that the activated portion of the powder or granular carbonaceous substance is allowed to ascend to and from a fluidized bed on successively higher perforated plates. The activated carbon of the highest grade of quality collects on the uppermost perforated plate as the final product.

U.S. Pat. No. 4,149,995, issued on Apr. 17, 1979 to H. N. Murty, discloses granular activated carbon manufactured from brown coal treated with a concentrated inorganic acid. The granular activated carbon is manufactured from briquettes formed from brown coal from which iron material has been extracted and which has a moisture content of about 15% by weight. The pre-treated coal briquettes are crushed and screened to produce granules. These granules are treated by mixing with a concentrated inorganic acid, without the addition of a carbonaceous binder, such as coal tar pitch. The granules are devolatilized without charring, by directly heating to and at a temperature higher than the charring temperature in an oxygen-free atmosphere, and then activating the heating to a temperature higher than the devolatizing temperature in an atmosphere containing a gaseous activating agent.

U.S. Pat. No. 4,499,208, issued on Feb. 12, 1985 to A. Fuderer, discloses an activated carbon adsorbent with increased heat capacity. The heat capacity of the activated carbon adsorbent pellets is enhanced by the mixing of activated carbon powder with a higher heat capacity, inert or inorganic material, such as dense alumina, prior to palletizing. The resulting doped adsorbent enhances the operation of adiabatic pressure swing adsorption process by decreasing the cyclic temperature change in the adsorbent bed during each processing cycle of the process.

U.S. Pat. No. 5,143,889, issued on Sep. 1, 1992 to Takahiro et al., teaches a process for preparing activated carbon. This process includes depositing an activated auxiliary on the surface of meso-carbon microbeads obtain from coal-derived pitch and activating by washing and drying the meso-carbon microbeads. The activating auxiliary is at least either MaOH or KOH and used in an amount of about five to about ten times the weight of the meso-carbon microbeads.

U.S. Pat. No. 5,726,118, issued on Mar. 10, 1998 to Ivey et al., describes an activated carbon composition having a mixture of a first activated carbon having a plurality of pore sizes and a second activated carbon having a plurality of pore sizes.

U.S. Pat. No. 5,858,911, issued on Jan. 12, 1999 to Wellen et al., discloses a method of producing activated carbon. This is a fine-celled foam that is non-toxic, environmentally friendly and has improved absorption/adsorption and retention of liquids. It is a foam mixture of a caustic silicate solution derived from the caustic digestion of rice hull ash having diffused activated carbon particles from thermal pyrolysis of rice hulls.

U.S. Pat. No. 6,228,803, issued on May 8, 2001 to Gadkaree et al., shows a method of making mesoporous carbon. This method includes forming a mixture of a high carbon-yielding carbon precursor and an additive. The carbon precursor yields greater than 40% carbon on a cured basis. The additive can be a catalyst metal and/or a low carbon-yielding carbon precursor. The mixture is cured of the carbon precursors are carbonized an activated to produce mesoporous activated carbon.

U.S. Pat. No. 7,759,289, issued on Jul. 20, 2010 to Iwisaki et al., teaches the formation of an activated carbon by subjecting a carbonaceous material to and activation treatment.

U.S. Pat. No. 9,987,614, issued on Jun. 5, 2018 to Trotta et al., shows a process for preparing a microporous carbon material. This method includes the steps of providing a cross-linked polymer by reacting a maltodextrin or a cyclodextrin, pyrolyzing at a temperature of between 700 to 900° C. in an inert gas flux, and cooling the obtained residue.

U.S. Patent Application Publication No. 2004/0097369, published on May 20, 2004 to Freel et al., discloses a method of producing an activated carbon that comprises the steps of pyrolyzing corn derivatives to generate char, and activating the char to produce activated corn carbon.

It is an object of the present invention to provide a process that produces a super pure activated carbon material.

It is another object of the present invention to provide a process in which the charcoal is produced from a natural wood or discarded byproducts from wood furnaces of bakeries.

It is another object of the present invention to provide a process that produces an activated carbon that can capture carbon dioxide generated in the combustion of fossil fuels.

It is another object of the present invention provide a process for producing an activated carbon that reduces greenhouse gases produced by carbon capture.

It is another object of the present invention to provide a process that produces activated carbon that has a reduced cost in comparison with conventional carbon capture methods.

It is still another object of the present invention to provide a process for producing an activated carbon that can be used so as to avoid carbon dioxide transportation and storage.

It is still another object of the present invention provide a process for producing an activated carbon that is environmentally friendly.

It is still another object of the present invention provide a process for producing an activated carbon which is sustainable.

It is still a further object the present invention to provide a process for producing an activated carbon in which the activated carbon can be used for the treatment of physical and health conditions in the human body.

These and other objects and advantages of the present invention will become apparent from a reading of the attached specification and appended claims.

BRIEF SUMMARY OF THE INVENTION

The present invention is a process for forming a pure carbon powder. The process comprises the steps of: (1) soaking charcoal with the hydrochloric acid so as to remove salts from the charcoal; (2) removing the hydrochloric acid from the soaked charcoal; (3) drying the soaked charcoal until the soaked charcoal is very dry; (4) grinding the dried charcoal to a fine charcoal powder; (5) mixing water with the fine charcoal powder; (6) washing the fine charcoal powder with a cloth material; (7) removing the water from the fine charcoal powder so as to form a charcoal slurry with a skim on a surface of the charcoal slurry; (8) removing the skim from the charcoal slurry; and (9) drying the charcoal slurry for a period of time so as to form the pure carbon powder.

In the process of the present invention, the charcoal is washed in water prior to the step of soaking the charcoal with the hydrochloric acid. In particular, the step of washing includes washing the charcoal with water for three times.

The step of removing the hydrochloric acid includes washing the soaked charcoal in water so as to remove the hydrochloric acid from the soaked charcoal. In particular, the soaked charcoal is washed four times during a day following the step of soaking the charcoal in order to neutralize the washed charcoal. A pH of the washed charcoal is tested so as to assure that the washed soaked charcoal is neutral.

The step of drying includes drying the soaked charcoal in an oven for a period of time at a temperature between 60 and 105° C. The step of mixing water with the fine charcoal powder includes adding water to the fine charcoal powder at a ratio of one part of water to two parts of the fine charcoal powder. In the step of washing the fine charcoal powder with a cloth material, the water and the fine charcoal powder are washed through a muslin cloth.

The washed fine charcoal powder settles for a period of time prior to the step of removing the water from the fine charcoal powder. This period of time in the step of settling is between three and four days.

The step of removing the water from the fine charcoal powder includes draining the water from the settled washed fine charcoal powder. In particular, the water is decanted from the settled and washed fine charcoal powder.

The skim is removed includes evaporating the slurry as the skim is removed. The charcoal slurry is dried in an oven at a temperature of between 60° and 105° C.

In the present invention, the charcoal is from natural wood or from discarded byproducts of wood furnaces of bakeries. Also, in the present invention, the fine carbon powder is packaged following the step of drying the charcoal slurry.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

BRIEF DESCRIPTION OF THE SEVERAL VIEWS OF THE DRAWINGS

FIG. 1 is a process diagram showing the process of forming a pure carbon powder in accordance with the present invention.

DETAILED DESCRIPTION OF THE INVENTION

Referring to FIG. 1, there is shown the process 10 for the formation of a pure carbon powder. In particular, this process 10 introduces charcoal 12 into a container 14 so that the charcoal 12 can be suitably washed. In particular, the charcoal 12 is washed three times with water 16. The water 16 is introduced into the container 14 so as to remove debris from the surface of the charcoal 10. The washed charcoal 12 then moves along line 18 so as to be in a container 20.

Container 20 allows hydrochloric acid 22 to be introduced into the washed charcoal 12. The hydrochloric acid is soaked with the washed charcoal for three nights in order to allow the salts 24 to be removed therefrom. The soaked charcoal 26 can be suitably washed in station 28. The hydrochloric acid-treated charcoal is washed with water 30 four times on the day following the step of soaking. The hydrochloric acid-treated charcoal is washed with water 30 so as to allow residual hydrochloric acid 32 to be removed therefrom. This process is repeated until the charcoal has a neutral pH.

The charcoal then moves along line 34 so as to the once again positioned in container 36 for washing off the hydrochloric acid 38. The hydrochloric acid 38 can then be suitably washed off of the charcoal. Ultimately, indicator paper is used so as to test the charcoal so as to assure that the charcoal is neutral. If the charcoal remains acidic, then further washing processes can be carried out on the charcoal so as to assure the neutrality of the charcoal. The pH of the soaking water can be tested in order to determine the neutrality of the charcoal.

The charcoal is then passed along line 40 to an oven 42. In the oven, the charcoal is dried at a temperature of between 60° and 105° C. for about twelve hours so as to be in a very dry condition. The dried charcoal 44 is then delivered into a grinder 46. The grinder 46 grinds the charcoal to a very fine powder. The ground powder 48 then passes to a mixer 50. Water 52 is introduced into the mixer 50 so as to mix with the charcoal. Water is added at a ratio of two parts water to one part charcoal in the mixer 50. This water and charcoal mixture 54 then passes to a muslin wash material 56. The water and fine charcoal powders are washed through the muslin cloth 56. This is carried out in two consecutive washes. In this muslin-washed fine charcoal powder and water 58 then passes to a settling chamber 60.

In the settling chamber 60, the mixture is allowed to settle for between three and four days. Ultimately, a skim will form on the on the water and find charcoal powders. This oil skim (i e defat) is then removed from the thick slurry by decanting 62. Ultimately, the slurry 64 remains after the skim is removed. The slurry 64 then passes to an evaporation chamber 66 and heated in batches so as to remove the skim 68. The thick slurry is defatted while the water evaporates off the living wet charcoal lumps. The thick carbon powder slurry then passes along line 72 and oven 72.

Oven 72 serves to dry the slurry at a temperature between 60 and 105° C. As a result, the pure carbon powder 74 is produced. This pure carbon powder 74 is allowed to cool, pass through a medium gauge sieve, and then packaged for distribution elsewhere.

The pure carbon powder 74 has a variety of uses. This powder can then be served as charcoal filter for the atmosphere of an airplane, as a carbon dioxide filter, as an air purifier, as a water purifier, or for charcoal face masks. Additionally, the present invention, the pure carbon powder is inert chemically and physiologically. As such, it is not digested nor absorbed into the bloodstream when consumed. It has been found that this carbon powder can capture and attract various toxins in the human body. As such, the pure carbon powder produced by the present invention can achieve a wide variety of health benefits.

The foregoing disclosure and description of the invention is illustrative thereof. Various changes in the details of the described process can be made is the scope of the present claims without departing from the true spirit of the invention. The present invention should only be limited by the following claims and their legal equivalents.

We claim:

1. A process for forming a pure carbon product, the process comprising:
   soaking charcoal with hydrochloric acid to remove solids from the charcoal;
   removing the hydrochloric acid from the soaked charcoal;
   drying the soaked charcoal until the soaked charcoal is dry;
   grinding the dried charcoal into a fine charcoal powder;
   mixing water with the fine charcoal powder;
   washing the fine charcoal powder;
   removing the water from the fine charcoal powder so as to form a charcoal slurry with a skim on a surface of the charcoal slurry,
   removing the skim from the charcoal slurry; and
   drying the charcoal slurry for a period of time so as to form the pure carbon powder.

2. The process of claim 1, further comprising:
   washing the charcoal in water prior to the step of soaking the charcoal with hydrochloric acid.

3. The process of claim 2, the step of washing the charcoal in water comprising:
   washing the charcoal in water three times.

4. The process of claim 1, the step of removing the hydrochloric acid comprising:
   washing the soaked charcoal in water so as to remove the hydrochloric acid from the soaked charcoal.

5. The process of claim 4, the step of washing the soaked charcoal comprising:

washing the soaked charcoal four times following the step of soaking the charcoal so as to neutralize the washed charcoal.

6. The process of claim 1, further comprising:
testing a pH of the washed soaked charcoal so as to assure that the washed soaked charcoal is neutral.

7. The process of claim 1, the step of drying the soaked charcoal comprising:
drying the soaked charcoal in an oven for a period of time at a temperature of 60° to 105° C.

8. The process of claim 1, the step of mixing water with the fine charcoal powder comprising:
adding water to the fine charcoal powder at a ratio of two parts of water to one part of the fine charcoal powder.

9. The process of claim 1, the step of washing the fine charcoal powder with the cloth material comprising:
washing the water and the fine charcoal powder through a muslin cloth.

10. The process of claim 1, further comprising:
settling the washed fine charcoal powder for a period of time prior to the step of removing the water from the fine charcoal powder.

11. The process of claim 10, the period of time for the step of settling being between three and four days.

12. The process of claim 10, the step of removing the water from the fine charcoal powder comprising:
draining the water from the settled washed fine charcoal powder.

13. The process of claim 12, the step of draining comprising:
decanting a supernatant from the settled washed fine charcoal powder.

14. The process of claim 1, the step of removing the skim comprising:
evaporating the slurry as the skim is removed.

15. The process of claim 1, the step of drying comprising:
drying the charcoal slurry in an oven.

16. The process of claim 15, the step of drying comprising:
drying the charcoal slurry at a temperature of between 60° and 105° C.

17. The process of claim 1, the charcoal being from natural wood.

18. The process of claim 1, further comprising:
packaging the pure carbon powder following the step of drying the charcoal slurry.

19. The process of claim 1, the step of washing comprising:
washing the fine charcoal product with a cloth material.

* * * * *